US012605969B2

(12) United States Patent
Bolzoni et al.

(10) Patent No.: US 12,605,969 B2
(45) Date of Patent: Apr. 21, 2026

(54) HIGH-PERFORMANCE TYRE

(71) Applicant: Pirelli Tyre S.p.A., Milan (IT)

(72) Inventors: Roberto Bolzoni, Milan (IT); Diego Ettore Speziari, Milan (IT)

(73) Assignee: PIRELLI TYRE S.p.A., Milan (IT)

(*) Notice: Subject to any disclaimer, the term of this patent is extended or adjusted under 35 U.S.C. 154(b) by 172 days.

(21) Appl. No.: 18/552,387

(22) PCT Filed: Mar. 24, 2022

(86) PCT No.: PCT/IB2022/052696
§ 371 (c)(1),
(2) Date: Sep. 25, 2023

(87) PCT Pub. No.: WO2022/208244
PCT Pub. Date: Oct. 6, 2022

(65) Prior Publication Data
US 2024/0198730 A1 Jun. 20, 2024

(30) Foreign Application Priority Data

Apr. 1, 2021 (IT) ......................... 102021000008243

(51) Int. Cl.
B60C 11/03 (2006.01)
(52) U.S. Cl.
CPC ...... B60C 11/0304 (2013.01); B60C 11/0302 (2013.01); B60C 2011/0348 (2013.01);
(Continued)
(58) Field of Classification Search
CPC . B60C 11/0302; B60C 11/0304; B60C 11/03; B60C 11/00
See application file for complete search history.

(56) References Cited

U.S. PATENT DOCUMENTS

2009/0114324 A1 5/2009 Ohki et al.
2014/0137998 A1 5/2014 Tanabe et al.
(Continued)

FOREIGN PATENT DOCUMENTS

EP 2 028 025 A1 2/2009
EP 2 732 981 A2 5/2014
(Continued)

OTHER PUBLICATIONS

International Search Report form the European Patent Office in corresponding International Application No. PCT/IB2022/052696 mailed Jun. 20, 2022.
(Continued)

*Primary Examiner* — Cedrick S Williams
(74) *Attorney, Agent, or Firm* — Finnegan, Henderson, Farabow, Garrett & Dunner, L.L.P.

(57) ABSTRACT

A car tyre (100), in particular a high or ultra high performance car tyre also suitable for use on track, is described; the tread band (1) of the tyre has a central region (L1), separated from two shoulder regions (L2, L3), respectively an outer shoulder region (L2) and inner shoulder region (L3); the outer shoulder region (L2) has a width greater than the width of the inner shoulder region (L3); the outer and inner shoulder regions are provided with relatively large grooves (5,6); in the outer shoulder region these grooves (5) alternate with narrower grooves (7), which reduce the stiffness of this tyre region only to a limited extend; the central region (L1) of the tyre, instead, was designed so as to have a low void-to-rubber ratio of equal to or smaller than 0.09.

35 Claims, 6 Drawing Sheets

(52) U.S. Cl.
CPC . *B60C 2011/0353* (2013.01); *B60C 2011/036* (2013.01); *B60C 2011/0365* (2013.01); *B60C 2011/0372* (2013.01); *B60C 2011/0383* (2013.01); *B60C 2011/0388* (2013.01); *B60C 2200/04* (2013.01)

(56) References Cited

U.S. PATENT DOCUMENTS

| | | | |
|---|---|---|---|
| 2016/0193880 A1* | 7/2016 | Colombo | B60C 11/0306 152/209.8 |
| 2017/0166014 A1 | 6/2017 | Takemoto | |

FOREIGN PATENT DOCUMENTS

| | | |
|---|---|---|
| EP | 3 178 668 A1 | 6/2017 |
| EP | 3 763 546 A1 | 1/2021 |
| JP | 2009-143450 A | 7/2009 |
| JP | 2017-56941 A | 3/2017 |
| WO | 02078982 A1 | 10/2002 |
| WO | 2009004408 A1 | 1/2009 |
| WO | 2015008137 A1 | 1/2015 |
| WO | 2019111089 A1 | 6/2019 |

OTHER PUBLICATIONS

Written Opinion of the International Searching Authority from the European Patent Office in corresponding International Application No. PCT/IB2022/052696 mailed Jun. 20, 2022.

* cited by examiner

HIGH-PERFORMANCE TYRE

This application is a national stage entry application under 35 U.S.C. § 371 of International Application No. PCT/IB2022/052696, filed on Mar. 24, 2022, and claims priority to Italian Application No. 102021000008243, filed Apr. 1, 2021; the contents of each application is incorporated herein by reference in its entirety.

FIELD OF THE INVENTION

The present invention relates to a car tyre, in particular a high or ultra high performance car tyre intended for use both on road and on track.

PRIOR ART

The following documents describe some examples of high or ultra high performance car tyres: WO2009/004408, WO2015/008137, WO02/078982, WO2019/111089.

SUMMARY OF THE INVENTION

High or ultra high performance car wheel tyres, also intended for use on track, are required to provide performance, steering precision and excellent grip to the ground, in order to be able to effectively transfer high torque to the ground and withstand high lateral stresses, even at the high operating temperatures associated with use on track. Better results in terms of performance and grip could be obtained with "slick" tyres, such as those used in racing, and/or with tyres characterized by a very low, substantially zero, void-to-rubber ratio.

This kind of tyres, however, although excellent in terms of performance on track, could normally not be used on road, due to the lower safety parameters in wet conditions. In certain climatic conditions, the presence of precipitation, by making the road surface wet, would indeed significantly reduce tyre grip and would not ensure road holding, adequate traction, effective braking.

The Applicant has observed that generally, in order to affect water drainage in the tyre contact area (footprint area) when driving on a wet road surface, an attempt is made to increase the number and/or size of the grooves both in circumferential and in transverse direction.

The presence of wide and deep grooves increases the void-to-rubber ratio of the tread band, positively affecting draining and grip features of tyres when driving on wet grounds.

However, the presence of wide and deep grooves in circumferential and/or transverse direction reduces the stiffness of the tread band, with a resulting risk of performance decay at high speed on dry grounds. Moreover, the presence of grooves generates noise. In view of the above, it is apparent that high or ultra high performance car tyres intended for use both on road and on track must meet several mutually conflicting requirements in order to provide good performance in each different road and weather condition.

The Applicant has thus faced the problem of providing car tyres, in particular high or ultra high performance car tyres intended for use both on road and on track, capable of ensuring high performance levels in straight running and in cornering, braking and traction, and low noise, without at the same time reducing draining and safety features on wet grounds.

The Applicant has focused its efforts to achieve this improvement by producing a tyre provided with a tread band having a central region, preferably of limited extension, separated from two broad shoulder regions, respectively a wider outer shoulder region and a narrower inner shoulder region. The outer and inner shoulder regions are provided with relatively wide grooves. In the outer shoulder region these grooves are interposed with other narrower grooves that moderately reduce the stiffness of this region of the tyre. The central region of the tyre, instead, has been designed so as to have a low void-to-rubber ratio, so that the tread has overall a controlled mix of portions with rubber in contact with the ground and yielding portions, in order to achieve performance and driving readiness.

In a first aspect thereof, the invention relates to a car tyre having:

a tread band comprising a central region, extending across an equatorial plane of the tyre, an outer shoulder region located towards an outer side of the tyre and an inner shoulder region located towards an inner side of the tyre;

a first circumferential groove axially delimiting the outer shoulder region relative to the central region and a second circumferential groove axially delimiting the inner shoulder region relative to the central region;

said outer shoulder region having a width greater than the width of the inner shoulder region;

wherein said outer shoulder region and said inner shoulder region comprise a plurality of first transverse grooves having a first end located substantially at a respective edge of the tread band, having a maximum width greater than, or equal to, 3 mm and an extension equal to at least 50% of the width of the shoulder region where they are located;

and wherein said outer shoulder region comprises a plurality of second transverse grooves substantially extending from said first circumferential groove;

said second transverse grooves have a width smaller than said first transverse grooves and a counter-inclined course relative to said first transverse grooves of said outer shoulder region;

said central region comprises a first and a second circumferential rib separated by a third circumferential groove, said first and second circumferential rib having a void-to-rubber ratio equal to, or smaller than, 0.09.

The Applicant has found that, thanks to these features, the tyre of the invention can achieve high performance levels, even on track, as well as low noise, while still being able to ensure driving safety on wet roads.

Without wishing to be bound by any specific theory, the Applicant believes that the outer shoulder region having a significant width increases roadholding, especially when cornering at high speed, whereas the transverse grooves of different kinds, in terms of width and positioning, and mutually counter-inclined, located in such region, promote high performance levels in terms of traction and braking by controlling "lateral pull" phenomena, i.e., limiting the onset of stress in the lateral direction on the tyre during straight running.

For the purposes of the present invention, the following definitions apply;

By "tread pattern" it is meant the representation of all points of the tread band (including recesses) in a plane perpendicular to the equatorial plane of the tyre and tangential to the maximum diameter of the tyre.

The measurements of angles and/or linear quantities (distances, widths, lengths, etc.) and/or surface areas are to be intended as referring to the tread pattern as defined above. Furthermore, considering the angular arrangement of the grooves formed in the tread band relative to the equatorial plane of the tyre, such angular arrangement shall be understood, for each point of the groove, as referring to the acute angle (i.e., an angle comprised between 0° and 90° in absolute value) defined by a rotation starting from the equatorial plane to the direction tangent to the groove passing through that point.

By the term "equatorial plane" of the tyre it is meant a plane perpendicular to the rotation axis of the tyre and dividing the tyre into two substantially equal portions.

By "circumferential" direction it is meant a direction generally directed according to the rotation direction of the tyre, or slightly inclined (e.g., by at most about 20°) relative to the rotation direction of the tyre.

By "axial" direction it is meant a direction substantially parallel to the rotation axis of the tyre, or at most slightly inclined (e.g., by at most about 20°) relative to the rotation axis of the tyre. Generally, the axial direction is substantially perpendicular to the circumferential direction.

By the term "effective width" referred to the tread band it is meant the width of the radially outermost portion of the tread band (from one edge to the other) intended to contact the ground.

By "void-to-rubber ratio" it is meant the ratio between the total surface area of the grooves in a given portion of the tread band (possibly of the whole tread band) and the total surface area of the given portion of the tread band (possibly of the whole tread band).

The present invention, in one or more preferred aspects thereof, may comprise one or more of the features presented hereafter.

Conveniently, the first transverse grooves may have substantially straight course.

Preferably, the void-to-rubber ratio of the inner shoulder region may result only form first transverse grooves.

Advantageously, in the inner shoulder region the first transverse grooves may have an extension equal to, or smaller than, 90% of the width of the inner shoulder region.

Preferably, the number of the first transverse grooves of the outer shoulder region is lower than the number of the first transverse grooves of the inner shoulder region.

Conveniently, the number of first transverse grooves of the inner shoulder region is about twice the number of first transverse grooves of the outer shoulder region.

Advantageously, the second transverse grooves may be inclined relative to a direction parallel to the equatorial plane so as to form an angle greater than 75°.

Preferably, the second transverse grooves may have an extension equal to, or smaller than, 90% of the width of the outer shoulder region.

Advantageously, the second transverse grooves do not have intersection points with the first transverse grooves.

Conveniently, in the outer shoulder region the second transverse grooves and the first transverse grooves may have a segment of their extension in a common circumferential annular portion having a width equal to at least ⅕ of the width of the outer shoulder region.

Advantageously, in the outer shoulder region the second transverse grooves and the first transverse grooves may have a segment of their extension in a common circumferential annular portion having a width equal to at most ⅔ of the width of the outer shoulder region.

Preferably, the first circumferential rib comprises third transverse grooves.

In order not to generate significant stiffness variations in axial direction, the third transverse grooves preferably extend so as to be located along the extension direction of the second transverse grooves.

Advantageously, the third transverse grooves may have an extension equal to, or smaller than, 80% of a width of the first circumferential rib.

Preferably, the third transverse grooves may have an extension equal to, or smaller than, 50% of a width of the first circumferential rib.

Conveniently, the second circumferential rib may comprise fourth transverse grooves.

Preferably, the fourth transverse grooves may have an extension equal to, or greater than, 50% of a width of the second circumferential rib.

Preferably, the fourth transverse grooves may extend over the full width of the second circumferential rib.

Conveniently, the fourth transverse grooves may have at least one first segment and at least one second segment, consecutively located relative to the first segment.

Preferably, the second segment may be counter-inclined relative to the first segment.

Advantageously, the first segment of the fourth transverse grooves may extend from the third circumferential groove.

Preferably, still in order to avoid significant stiffness variations in axial direction in the grooves, the first segment of the fourth transverse grooves may extend so as to be located along the extension direction of the second transverse grooves.

Advantageously, the first segment of the fourth grooves extends over at most 20% of the total extension of the fourth transverse grooves.

Conveniently, the second segment of the fourth grooves extends over at least 50% of the total extension of the fourth transverse grooves.

Preferably, the second segment of the fourth transverse grooves has a first portion having a width equal to, or greater than, 3 mm.

Conveniently, the second segment of the fourth transverse grooves may have a second portion having a width smaller than the width of the first portion.

In some embodiments, the outer shoulder region comprises a plurality of longitudinal grooves, having a substantially circumferential course.

Advantageously, said longitudinal grooves intersect at least some of said first transverse grooves.

Advantageously, said longitudinal grooves are joined to at least some of said second transverse grooves.

Preferably, the void-to-rubber ratio of the first circumferential rib may result only from said third transverse grooves.

In a different embodiment, the first circumferential rib may comprise a plurality of fifth transverse grooves.

Advantageously, the fifth transverse grooves may have an extension equal to, or smaller than, 50% of a width of the first circumferential rib.

Preferably, the fifth transverse grooves may have a width greater than the third transverse grooves.

Preferably, the void-to-rubber ratio of the second circumferential rib may result only form fourth transverse grooves.

In a different embodiment, the second circumferential rib may comprise a plurality of sixth transverse grooves.

Advantageously, the sixth transverse grooves may have an extension equal to, or greater than, 50% of a width of the second circumferential rib.

Conveniently, the central region comprises a third circumferential rib separated from the first circumferential rib by a fourth circumferential groove.

Advantageously, the third circumferential rib has a void-to-rubber ratio equal to, or smaller than, 0.09.

Preferably, the third circumferential rib may comprise a plurality of seventh transverse grooves.

Conveniently, the seventh transverse grooves may have an extension equal to, or greater than, 60% of a width of the third circumferential rib.

Preferably, the seventh transverse grooves may extend over the full width of the third circumferential rib.

Advantageously, the seventh transverse grooves may extend from the first circumferential groove.

Preferably, the seventh transverse grooves may extend so as to be located along the extension direction of the second transverse grooves.

Conveniently, the seventh transverse grooves may have a first portion and a second portion, wherein the second portion has a width smaller than the width of the first portion.

Further features and advantages of the invention shall become clearer from the detailed description of some preferred, although not exclusive, embodiments of a high or ultra high performance car tyre, intended for use also on track, according to the present invention.

BRIEF DESCRIPTION OF THE DRAWINGS

Such description shall be made hereafter with reference to the accompanying drawings, provided only for indicating, and thus non-limiting, purposes, wherein.

DETAILED DESCRIPTION OF EMBODIMENTS OF THE INVENTION

Figure 1:
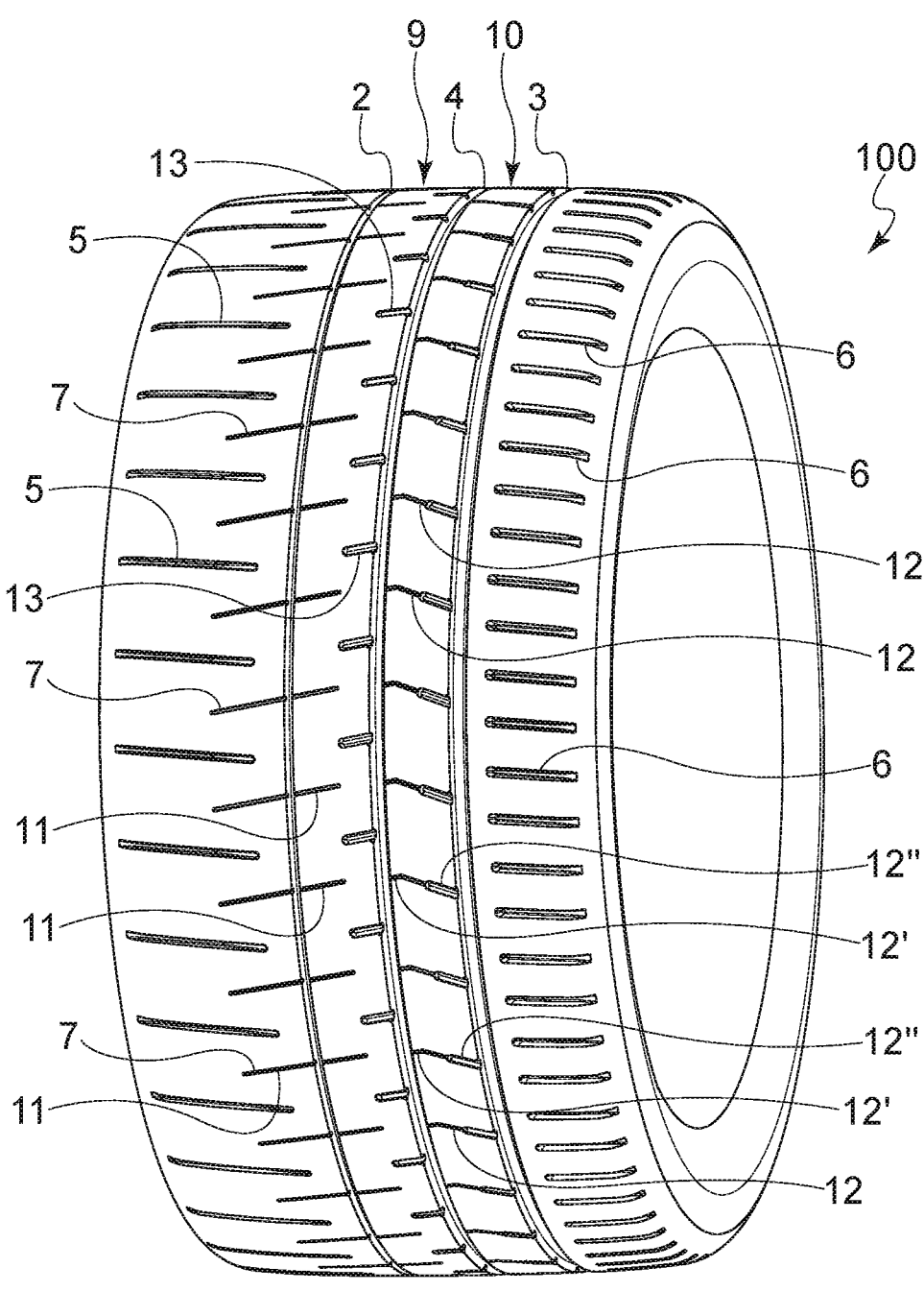
FIG. 1 shows a view of an example of a tyre according to the invention.
Figure 2:
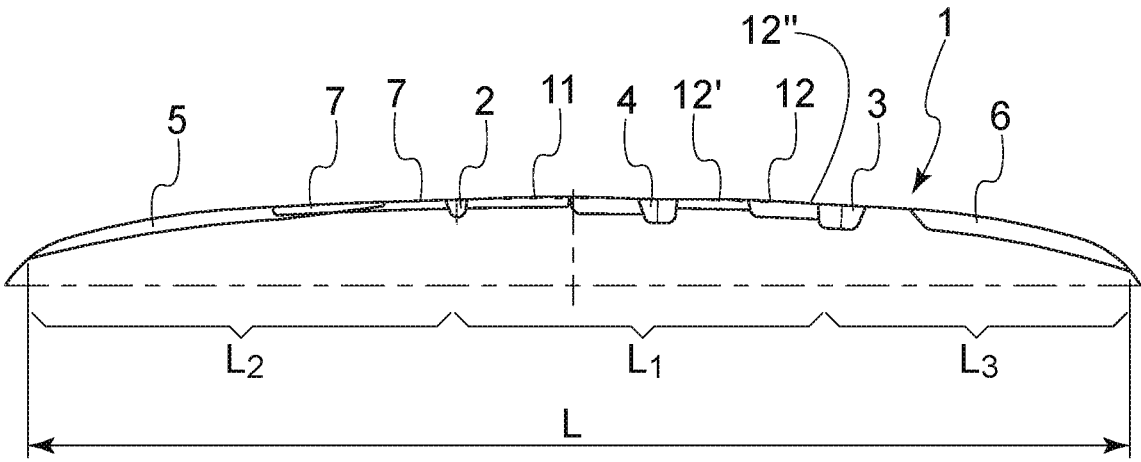
FIG. 2 is an enlarged view of a cross-section of the tyre of FIG. 1.

With reference to the attached figures, a tyre for car wheels, in particular for wheels of high or ultra high performance cars, also intended for use on track, is generally indicated at 100.

The structure of the tyre 100 is in itself of a conventional type and comprises a carcass, a tread band 1 placed in crown to the carcass, a pair of axially opposed sidewalls, ending in beads reinforced by bead cores and associated bead fillers. The tyre preferably also comprises a belt structure interposed between the carcass and the tread band. The carcass comprises one or more carcass plies anchored to the bead cores, whereas the belt structure comprises two radially superimposed belt strips. The belt strips are formed of pieces of a rubberized fabric incorporating metal cords parallel to one another in each strip and having a crossed orientation, preferably with a symmetrical inclination relative to the equatorial plane, relative to the cords of adjacent strips. Preferably, the belt structure also comprises, in a radially outer position, a third belt layer provided with cords oriented substantially parallel to the equatorial plane. Preferably, although not necessarily, the tyre according to the invention has a nominal section width of at least about 205, more preferably of at least about 225. For example, the tyre may have a nominal section width of 225, 245, 275, 295, 355. Preferably, the tyre according to the invention has a reduced section height. For example, the section height may be smaller than, or equal to, 60%, more preferably smaller than, or equal to, 50%, of the nominal section width.

The tread band 1 has overall a low void-to-rubber ratio, preferably smaller than, or equal to, 0.30, more preferably smaller than, or equal to, 0.26, even more preferably smaller than, or equal to, 0.20.

Preferably, the overall void-to-rubber ratio of the tread 1 is greater than 0.14.

Preferably, although not necessarily, the tyre according to the invention is of the asymmetrical type, i.e., the tread band pattern of the tyre on the right of the equatorial plane X-X is substantially different from that on the left. Therefore, the tyre 100 and/or the tread band 1 has an inner side to be preferably arranged, when fitted, towards the inside of the vehicle (on the right in the examples shown in the figures) and an outer side to be preferably arranged towards the outside of the vehicle (on the left in the examples shown in the figures).

The tread band 1 is provided with at least two circumferential grooves, respectively a first 2 and a second 3 circumferential groove, extending in a substantially circumferential direction.

The first and second circumferential grooves 2 and 3 respectively separate a central region L1 of the tread band 1 from an outer shoulder region L2 and from an inner shoulder region L3 of the tread band 1, respectively located to the left and right of the central region L1. The outer shoulder region L2 is located on the outer side of the tyre, whereas the inner shoulder region L3 is located on the inner side of the tyre.

The central region L1 extends across the equatorial X-X plane of the tyre. The outer L2 and inner L3 shoulder regions extend close to the axial ends of the tread band 1.

In the embodiments shown in FIGS. 1-5, the central region L1 takes up a limited portion of the tread band 1.

In these embodiments, the central region L1 may have a width smaller than, or equal to, 35% of the effective width of tread band 1, i.e., the width of the region of the tread band 1 intended to contact the ground. The outer shoulder region L2 has a width greater than 30% of the effective width of tread band 1; the inner shoulder region L3 has a width smaller than 35% of the effective width of tread band 1.

Figure 6:
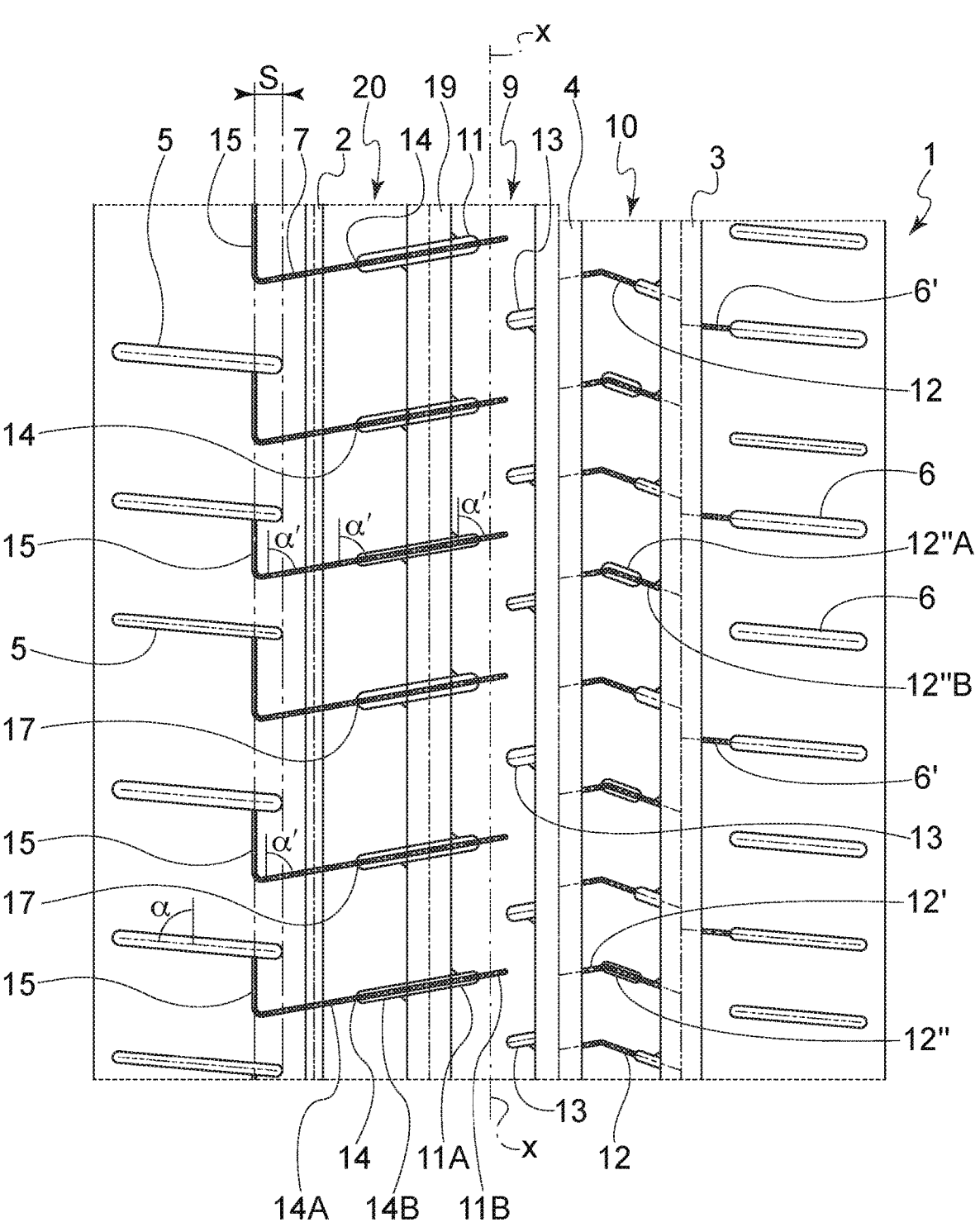
FIG. 6 is a schematic plan view of a tread band portion of a fourth example of a tyre according to the invention.

In the embodiment shown in FIG. 6, the central region L1 may have a width smaller than, or equal to, 50% of the effective width of the tread band 1; the outer shoulder region L2 has a width greater than 25% of the effective width of tread band 1 and the inner shoulder region L3 has a width smaller than 25% of the effective width of tread band 1.

Preferably, in the tyre 100 of the invention the outer shoulder region L2 has a width greater than the width of the inner shoulder region L3.

The first circumferential groove 2 delimits in axial direction the outer shoulder region L2 relative to the central region L1 of the tread band 1, whereas the second circumferential groove 3 delimits in axial direction the inner shoulder region L3 relative to the central region L1.

Preferably, the first 2 and second 3 circumferential grooves have a substantially straight course in the circumferential direction, preferably along the whole circumferential development of the tyre.

The first circumferential groove 2 may have a different width as compared to the second circumferential groove 3.

In the embodiments shown in FIGS. 1-4 and 6 the first circumferential groove 2 has a width smaller than the width of the second circumferential groove 3. For example, in these embodiments the first circumferential groove 2 may have a width smaller than 50% of the width of the second circumferential groove 3.

In these cases, the first circumferential groove 2 is mainly intended to provide a substantial continuity in behavior between the outer shoulder region L2 and the outermost portion of the central region L1, the function of draining water from the footprint area being thus assigned mainly to the other circumferential grooves, described below.

In the embodiments shown in FIGS. 1-4 and 6, the first circumferential groove 2 may, for example, have a width smaller than, or equal to, about 8 mm, more preferably smaller than, or equal to, about 6 mm, in any case greater than, or equal to, about 2 mm.

Figure 4:
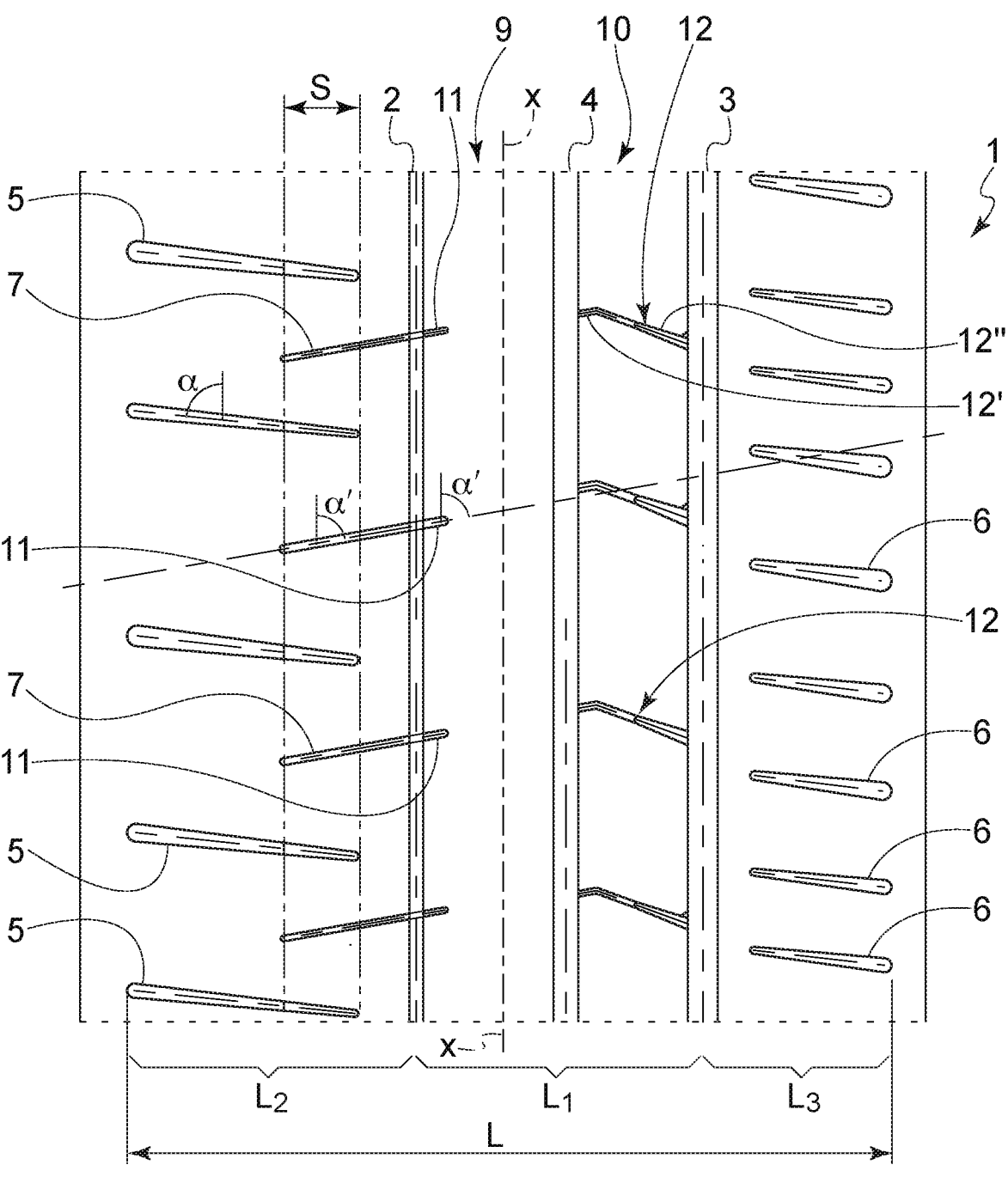
FIG. 4 is a schematic plan view of a tread band portion of a second example of a tyre according to the invention.
Figure 5:
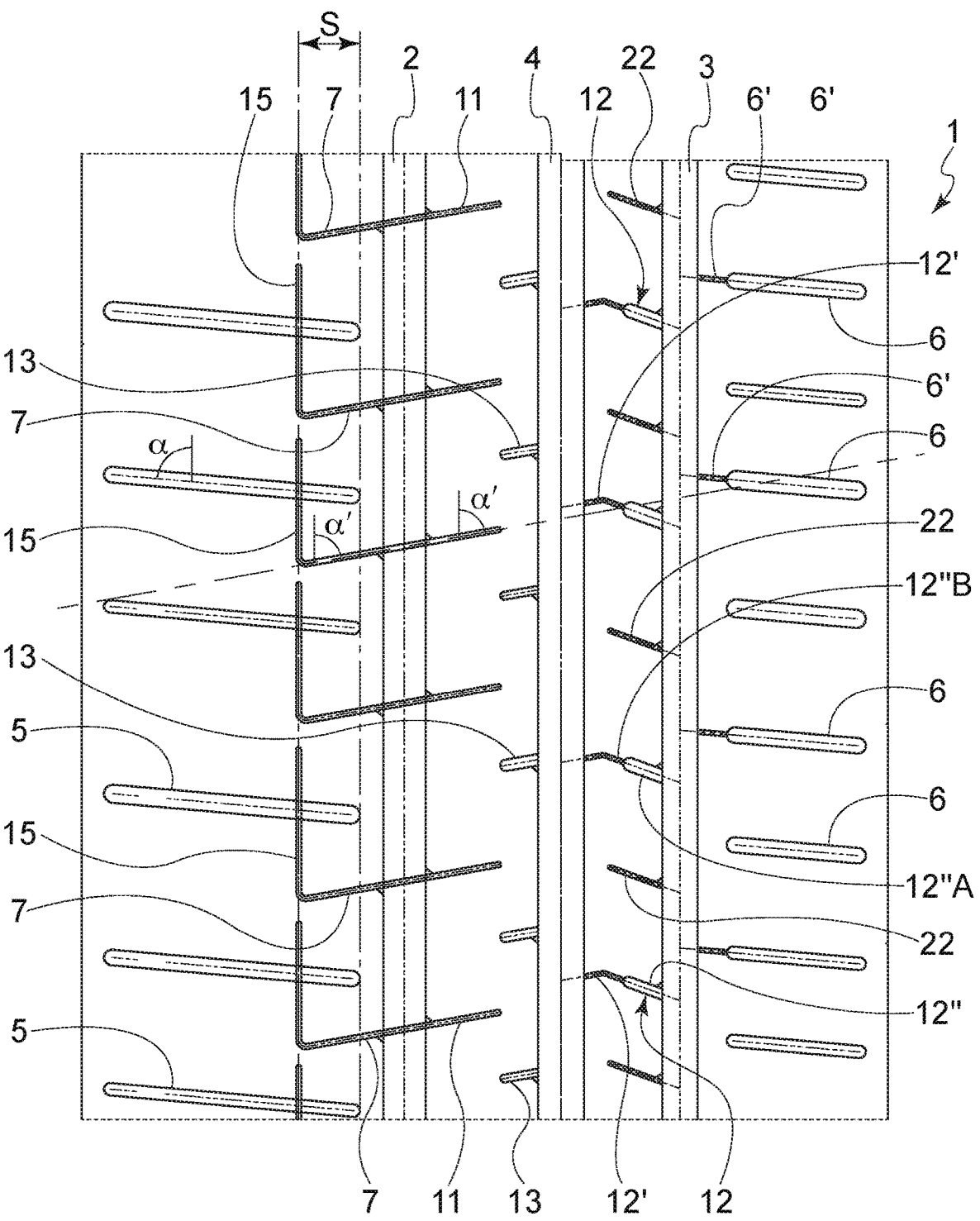
FIG. 5 is a schematic plan view of a tread band portion of a third example of a tyre according to the invention.

In the embodiment shown in FIG. 5 the first circumferential groove 2 has a width comparable to, or slightly greater than, the width of the second circumferential groove 3. For example, in these embodiments the first circumferential groove 2 may have a width at most about 20% greater than the width of the second circumferential groove 3. Preferably, in the embodiments shown in FIGS. 1-6 the second circumferential groove 3 may have a width greater than, or equal to, about 8 mm, more preferably greater than, or equal to, about 10 mm, in any case smaller than, or equal to, about 15 mm.

Preferably, the first and second circumferential grooves 2 and 3 may have a depth smaller than, or equal to, about 8 mm, in any case greater than, or equal to, about 2 mm. In all embodiments shown in FIGS. 1-6, the tread band 1 further comprises a third circumferential groove 4 in the central region L1.

Preferably, the third circumferential groove 4 also has a substantially straight course.

Preferably, the third circumferential groove 4 has a width greater than the width of the first circumferential groove 2.

In the embodiments of FIGS. 1-4, the third circumferential groove 4 has a width smaller than the width of the second circumferential groove 3.

In the embodiment of FIGS. 5-6, the third circumferential groove 4 has a width greater than the width of the second circumferential groove 3.

Preferably, in all of the four embodiments, the third circumferential groove 4 may have a width greater than, or equal to, about 7 mm, more preferably greater than, or equal to, about 8 mm, in any case smaller than, or equal to, about 15 mm.

The third circumferential groove 4 may have a depth smaller than, or equal to, about 9 mm, more preferably smaller than, or equal to, about 8 mm, in any case greater than, or equal to, about 3 mm.

Preferably, the first circumferential groove 2 has a depth equal to, or smaller than, the depth of the third circumferential groove 4. Preferably, the second circumferential groove 3 has a depth equal to, or smaller than, the depth of the third circumferential groove 4.

Still referring to the embodiments shown in FIGS. 1-6, at least the second and the third circumferential grooves 3 and 4 are configured so as to have a straight section of substantially trapezoidal shape.

In an embodiment, such as, for example, that shown in FIG. 6, the tread band 1 further comprises a fourth circumferential groove 19 in the central region L1.

Preferably, the fourth circumferential groove 19 has a width greater than the width of the first 2 and of the second 3 circumferential groove, but smaller than the width of the third circumferential groove 4.

Preferably, the fourth circumferential groove 19 also has a substantially straight course. Preferably, the fourth circumferential groove 19 may have a width greater than, or equal to, about 9 mm, more preferably greater than, or equal to, about 10 mm, in any case smaller than, or equal to, about 18 mm.

The fourth circumferential groove 19 may have a depth smaller than, or equal to, about 9 mm, more preferably smaller than, or equal to, about 8 mm, in any case greater than 2 mm.

Preferably, the fourth circumferential groove 19 has a depth equal to, or smaller than, the depth of the third circumferential groove 4.

Preferably, the first circumferential groove 2 has a depth equal to, or smaller than, the depth of the fourth circumferential groove 19.

Preferably, the second circumferential groove 3 has a depth equal to, or smaller than, the depth of the fourth circumferential groove 19.

Preferably, the fourth circumferential groove 19 has a straight section of substantially trapezoidal shape.

The outer shoulder region L2, as well as the inner shoulder region L3, has good stiffness, so as to provide readiness of response to the tyre especially at high speeds and when cornering.

In order to make the shoulder regions of the tyre stiff, the outer L2 and inner L3 shoulder regions have a limited void-to-rubber ratio.

Preferably, the outer shoulder region L2 and/or the inner shoulder region L3 have a void-to-rubber ratio smaller than about 0.20, preferably smaller than about 0.18.

Preferably, the outer shoulder region L2 and/or the inner shoulder region L3 have a void-to-rubber ratio greater than about 0.05, preferably greater than about 0.07.

Preferably, the inner shoulder L3 region has a void-to-rubber ratio greater than the void-to-rubber ratio of the outer shoulder region L2.

The inner shoulder region L3 comprises circumferentially repeated first transverse grooves 6.

The void-to-rubber ratio of the inner shoulder region L3 preferably results only from such first transverse grooves 6.

In other words, preferably, no other kind of grooves and/or recesses (leaving out the second circumferential groove 3) are present in the inner shoulder region L3.

Preferably, the first transverse grooves 6 of the inner shoulder region L3 have a substantially straight course.

Preferably, the first transverse grooves 6 of the inner shoulder region L3 have a substantially transverse course or a course only slightly inclined relative to the axial direction.

In particular, the course of the first transverse grooves 6 forms with the equatorial plane X-X an angle of between 750 and 900 in absolute value.

The first transverse grooves 6 of the inner shoulder region L3 have a maximum width greater than, or equal to, about 3 mm. Preferably, they have a maximum width smaller than about 8 mm. For example, they may have a maximum width of between about 3.5 and about 7 mm.

The first transverse grooves 6 of the inner shoulder region L3 may have, as in the examples shown in FIGS. 1-3, 5, 6, a substantially constant width along their extension. In an alternative embodiment, as shown for example in FIG. 4, the first transverse grooves 6 of the inner shoulder region L3 have a width that substantially increases moving away from the equatorial plane X-X.

Preferably, the first transverse grooves 6 of the inner shoulder region L3 have a maximum depth of at least about 2 mm and smaller than about 8 mm.

The first transverse grooves 6 of the inner shoulder region L3 may have a depth that is not constant along their respective extension, for example a depth that decreases, preferably gradually, moving towards the axially outer edges of the tread band 1.

The first transverse grooves 6 of the inner shoulder region L3 have a first end located substantially at the respective axially outer edge of the tread band 1, and extend from said end in a substantially axial direction over at least 50% of the width of the inner shoulder region L3.

Preferably, the first transverse grooves 6 of the inner shoulder region L3 may have an extension equal to, or smaller than, 70% of the width of the inner shoulder region L3. The first transverse grooves 6 of the inner shoulder region L3 may have an extension equal to, or smaller than, 90% of the width of the inner shoulder region L3.

Preferably, the first transverse grooves 6 of the inner shoulder region L3 do not have intersection points with the second circumferential groove 3.

In some embodiments, such as those shown in FIGS. 5-6, some of the first grooves 6 may be connected to the second circumferential groove 3 by means of transverse sipes 6'.

The transverse sipes 6' extend, preferably in an axial direction, from one end of the first transverse grooves 6 to the second circumferential groove 3.

The 6' sipes may have an extension equal to at most 15% of the width of the inner shoulder region L3.

The transverse sipes 6' may have, as in the examples shown in FIGS. 5, 6, a substantially constant width along their extension.

The transverse sipes 6' may have, as in the examples shown in FIGS. 5, 6, a maximum width smaller than 2 mm.

The transverse sipes 6' may have, as in the examples shown in FIGS. 5, 6, a maximum depth smaller than 2 mm.

Preferably, not all of the first transverse grooves 6 of the inner shoulder region L3 have a transverse sipe 6'.

In the embodiment shown in FIGS. 5 and 6, first transverse grooves 6 having transverse sipes 6' are alternated in circumferential direction with first transverse grooves 6 lacking transverse sipes 6'.

The outer shoulder region L2 comprises at least first transverse grooves 5 and second transverse grooves 7 circumferentially alternated with one another.

Thus, the void-to-rubber ratio in the outer shoulder region L2 results at least from first 5 and second 7 transverse grooves.

In the embodiments shown in FIGS. 5, 6 the outer shoulder region L2 further has longitudinal grooves 15, described in more detail below.

The number of first transverse grooves 5 of the outer shoulder region L2 is smaller than the number of first transverse grooves 6 of the inner shoulder region L3.

Preferably, the number of first transverse grooves 6 of the inner shoulder region L3 is about twice the number of first transverse grooves 5 of the outer shoulder region L2.

Preferably, the first transverse grooves 5 of the outer shoulder region L2 have a substantially straight course.

Preferably, the first transverse grooves 5 of the outer shoulder region L2 have a substantially transverse course or a course only slightly inclined relative to the axial direction.

In particular, the course of the first transverse grooves 5 of the outer shoulder region L2 forms with the equatorial plane X-X an angle α of between 750 and 900 in absolute value.

The first transverse grooves 5 of the outer shoulder region L2 may have, as in the examples shown in FIGS. 1, 3, 5, 6, a substantially constant width along their extension.

In an alternative embodiment, as shown for example in FIG. 4, the first transverse grooves 5 have instead a width that substantially increases along their extension moving away from the equatorial plane X-X.

The first transverse grooves 5 of the outer shoulder region L2 have a maximum width greater than, or equal to, about 3 mm. Preferably, they have a maximum width smaller than about 8 mm. For example, they may have a maximum width of between about 3.5 and about 7 mm.

Preferably, the first transverse grooves 5 of the outer shoulder region L2 have a maximum depth of at least about 2 mm and smaller than about 8 mm.

The first transverse grooves 5 of the outer shoulder region L2 may have a depth that is not constant along their respective extension, for example a depth that decreases, preferably gradually, moving towards the axially outer edges of the tread band 1.

The first transverse grooves 5 of the outer shoulder region L2 have a first end located substantially at the respective axially outer edge of the tread band 1, and extend from said end in a substantially axial direction over at least 50% of the width of the outer shoulder region L2.

Preferably, the first transverse grooves 5 of the outer shoulder region L2 may have an extension equal to, or smaller than, 70% of the width of the outer shoulder region L2. The first transverse grooves 5 of the outer shoulder region L2 may have an extension equal to, or smaller than, 90% of the width of the outer shoulder region L2.

Preferably, the first transverse grooves 5 of the outer shoulder region L2 do not have intersection points with the first circumferential groove 2.

The second transverse grooves 7 located in the outer shoulder region L2 preferably extend from the first circumferential groove 2, in a substantially axial direction, for at least 20% of the width of the outer shoulder region L2.

Preferably, the second transverse grooves 7 have an extension equal to, or smaller than, 90% of the width of said outer shoulder region L2.

Preferably, the second transverse grooves 7 have a substantially straight course.

The second transverse grooves 7 also have a substantially transverse course or a course only slightly inclined relative to the axial direction, but counter-inclined relative to the first transverse grooves 5.

In particular, the course of the second grooves 7 forms an angle α' with the equatorial plane X-X of between 750 and 90° in absolute value, but opposite in sign relative to that of the first transverse grooves 5.

Preferably, the second transverse grooves 7 do not have intersection points with the first transverse grooves 5, but they are mutually located such that on the outer shoulder region L2 the second transverse grooves 7 and the first transverse grooves 5 have a segment of their extension lying in a common circumferential annular portion S.

Preferably, the common circumferential annular portion S has a width equal to at least ⅓ of the width of the outer shoulder region L2.

Preferably, the common circumferential annular portion S has a width equal to at most ⅔ of the width of the outer shoulder region L2.

The second transverse grooves 7 have a width smaller than the width of the first transverse grooves 5, 6.

Preferably, the second transverse grooves 7 have a maximum width smaller than about 3 mm. For example, they may have a width of between about 1.2 and about 3 mm.

Preferably, the second transverse grooves 7 have a maximum depth of at least about 1.5 mm and smaller than about 4 mm.

In some embodiments, such as those shown in FIGS. 5 and 6, the outer shoulder region L2 may have a plurality of longitudinal grooves 15.

The longitudinal grooves 15 extend with a substantially straight course in a substantially circumferential direction.

Preferably, the longitudinal grooves 15 extend in a circumferential direction so as to join at least some of the second transverse grooves 7, preferably all of the second transverse grooves 7.

Preferably, the longitudinal grooves 15 extend in a circumferential direction until they reach at least a first transverse groove 5.

In the embodiment shown in FIG. 5, the longitudinal grooves 15 extend in a circumferential direction until they intersect, and go slightly beyond, a first transverse groove 5.

In the embodiment shown in FIG. 6, instead, the longitudinal grooves 15 extend in a circumferential direction until they intercept a first transverse groove 5, but without extending beyond the latter in circumferential direction.

In the embodiments shown in FIGS. 5 and 6, each longitudinal groove 15 extends from one end of a respective second transverse groove 7 seamlessly, i.e., so as to form a single groove with the latter.

Preferably, the longitudinal grooves 15 have a width smaller than the width of the first transverse grooves 5, 6.

Preferably, the longitudinal grooves 15 have a width smaller than about 4 mm. For example, they may have a width of between about 1.2 and about 3 mm.

Preferably, the longitudinal grooves 15 have substantially the same width as the second transverse grooves 7.

Preferably, the longitudinal grooves 15 have a maximum depth of at least about 1.5 mm and smaller than about 4 mm.

The central region L1 is designed so as to provide a high amount of rubber on the ground at the most central portion of tread band 1, i.e., near the equatorial plane X-X of tyre 1, keeping the stiffness of tread band 1 as uniform as possible.

To this end, the central region L1 has a void-to-rubber ratio smaller than about 0.40, preferably smaller than about 0.36. Preferably, the central region L1 has a void-to-rubber ratio greater than about 0.25, preferably greater than about 0.28.

In the embodiments shown in FIGS. 1-5, the third circumferential groove 4, together with the first 2 and the second 3 circumferential grooves, defines, in the central region L1, a first 9 and a second 10 circumferential rib.

In the embodiment shown in FIG. 6, the third circumferential groove 4 and the fourth circumferential groove 19, together with the first 2 and the second 3 circumferential grooves, define, in the central region L1, a first 9, a second 10 and a third 20 circumferential rib.

In the embodiment shown in FIGS. 1-5, the first circumferential rib 9 is located between the first circumferential groove 2 and the third circumferential groove 4; the second circumferential rib 10 is located between the third circumferential groove 4 and the second circumferential groove 3.

In the embodiment shown in FIG. 6, the first circumferential rib 9 is located between the third circumferential groove 4 and the fourth circumferential groove 19; the second circumferential rib 10 is located between the third circumferential groove 4 and the second circumferential groove 3; the third circumferential rib 20 is located between the first circumferential groove 2 and the fourth circumferential groove 19.

In order to increase the amount of "rubber on the ground" at the central region L1, thus optimizing handling features, noise and rolling resistance, the central region L1 and the circumferential ribs 9,10 are characterized by low void-to-rubber ratios.

At least one of the first 9 and the second 10 circumferential rib, preferably both of them, has, in fact, a void-to-rubber ratio smaller than, or equal to, about 0.075, more preferably smaller than, or equal to, about 0.05.

To this end, the first 9 and the second 10 circumferential rib may respectively comprise a plurality of third 11 and fourth 12 transverse grooves having a limited width and/or extension.

In order not to generate excessive and abrupt stiffness variations between outer shoulder L2 and central portion L1, in the first circumferential rib 9 the third transverse grooves 11 extend, preferably from the first circumferential groove 2, so as to be located along the extension direction of the second transverse grooves 7 located in the outer shoulder region L2.

Preferably, the course of the second transverse grooves 11 forms an angle $\alpha'$ with the equatorial plane X-X of between 750 and 90°.

Preferably, the third transverse grooves 11 extend over at most 80% of the width of the circumferential rib 9.

More preferably, the third transverse grooves 11 extend over at most 50% of the width of the circumferential rib 9.

In the embodiment shown in FIG. 4 the third grooves 11 extend over at most 30% of the width of the circumferential rib 9.

The third transverse grooves 11 may have a substantially straight course.

The third transverse grooves 11 are mutually arranged at a distance in circumferential direction preferably of between 25 mm and 80 mm.

The third transverse grooves 11 have a maximum width smaller than the maximum width of the first transverse grooves 5, 6.

Preferably, the third transverse grooves 11 have a width smaller than about 3 mm. For example, they may have a width of between about 1.2 and about 3 mm.

Preferably, the third transverse grooves 11 have a width substantially equal to the width of the second transverse grooves 7.

The third transverse grooves 11 may have a depth greater than, or equal to, about 2 mm.

Preferably, the third transverse grooves 11 may have a depth smaller than about 5 mm.

For example, they may have a depth of between about 2.5 and about 4.5 mm.

The third transverse grooves 11 may have a depth that is not constant along their respective extension.

In some embodiments, such as for example that shown in FIG. 6, the third grooves 11 have a first portion 11A and a second portion 11B having different widths arranged consecutively to each other.

Figure 3:
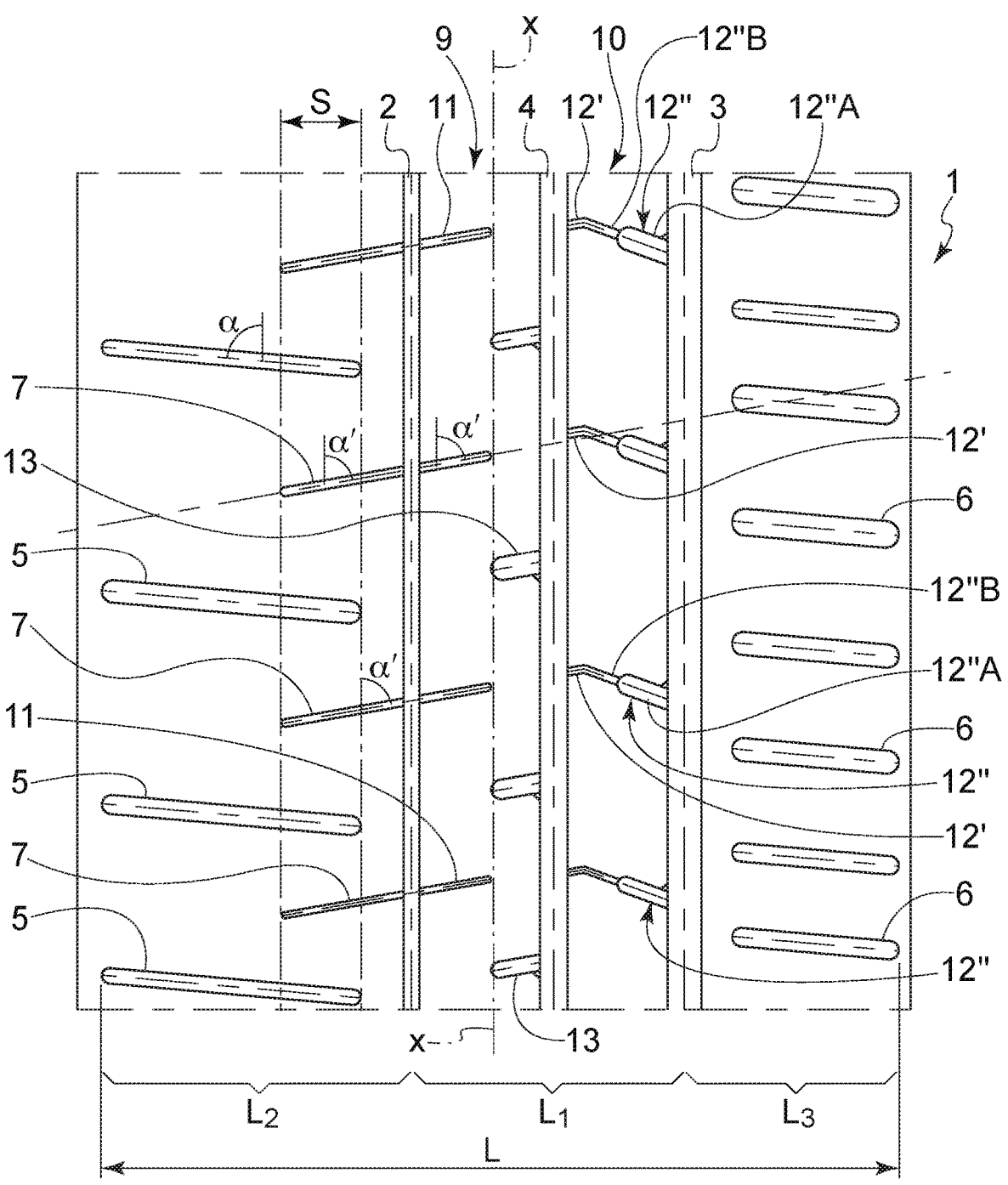
FIG. 3 is a schematic plan view of a tread band portion of the tyre of FIG. 1.

The first circumferential rib 9 may comprise, as in the examples of FIGS. 3, 5, 6, a plurality of fifth transverse grooves 13.

In the first circumferential rib 9 the fifth transverse grooves 13 preferably extend from the third circumferential groove 4.

Preferably, the fifth transverse grooves 13 have a substantially straight course.

The fifth transverse grooves 13 extend over at most 50% of the width of the circumferential rib 9, preferably at most 30% of the width of the circumferential rib 9. In the embodiments shown in FIGS. 3, 5, 6, the fifth transverse grooves 13 extend in a direction substantially parallel to the direction of the third transverse grooves 11.

The fifth transverse grooves 11 are inclined so as to form an angle α' with the equatorial plane X-X preferably of between 750 and 90°.

The fifth transverse grooves 13 have a width greater than the width of the third transverse grooves 11. Preferably, the fifth transverse grooves 13 have a width equal to, or greater than, about 3 mm.

For example, they may have a width of between about 3.5 to about 6 mm.

The fifth transverse grooves 13 may have a depth greater than, or equal to, about 2 mm. For example, they may have a depth of between about 2.5 mm and about 5 mm. The fifth transverse grooves 13 may have a depth that is not constant along the respective extension.

The second circumferential rib 10 comprises a plurality fourth transverse grooves 12.

The fourth transverse grooves 12 extend over at least 50% of the width of the second circumferential rib 10.

Preferably, the fourth transverse grooves 12 extend over at least 90% of the width of the second circumferential rib 10.

Preferably, the fourth grooves 12 extend from the second circumferential groove 3 to the third circumferential groove 4, i.e., over the full width of the second circumferential rib 10.

The fourth transverse grooves 12 have at least one first segment 12' and at least one second segment 12", consecutively located relative to the first segment 12'.

The first segment 12' and, respectively, the second segment 12" preferably have a substantially straight course.

Preferably, the second segment 12" is counter-inclined relative to the first segment 12'. In order to limit excessive stiffness variations in the tread band in axial direction, in some embodiments, such as those shown for example in FIGS. 1-3, 4, the first segment 12' of the fourth grooves 12 extends so as to be located substantially along the extension direction of the second transverse grooves 7.

In the embodiments shown in FIGS. 5 and 6, the extension direction of the first segment 12' of the fourth transverse grooves 12 is substantially parallel, but circumferentially offset, relative to the extension direction of the second transverse grooves 7.

In some embodiments, for example those shown in FIGS. 1-3, 4 and 5, the second segment 12" has a first portion 12"A and a second portion 12"B having different widths, arranged consecutively to each other.

Preferably, the fourth transverse grooves 12 have a width equal to, or greater than, about 1 mm.

Preferably, the fourth transverse grooves 12 have a width equal to, or smaller than, about 6 mm.

The fourth transverse grooves 12 may have a depth greater than, or equal to, about 2 mm. For example, they may have a depth of between about 2.5 and about 5 mm.

The fourth transverse grooves 12 may have a depth that is not constant along their respective extension.

The second circumferential rib 10 may have, as in the embodiment shown in FIG. 5, a plurality of sixth transverse grooves 22.

Preferably, the sixth transverse grooves 22 extend from the second circumferential groove 3.

Preferably, the sixth transverse grooves 22 have a substantially straight course.

Preferably, the sixth transverse grooves 22 extend over at most 80% of the width of the second circumferential rib 10.

Preferably, the sixth transverse grooves 22 extend in a direction substantially parallel to the direction of the second segment 12" of the fourth transverse grooves 12.

Preferably, the sixth transverse grooves 22 have a width equal to, or greater than, about 1 mm.

Preferably, the sixth transverse grooves 22 have a width equal to, or smaller than, about 6 mm.

The sixth transverse grooves 22 may have a depth greater than, or equal to, about 2 mm. For example, they may have a depth of between about 2.5 and about 5 mm. The sixth transverse grooves 22 may have a depth that is not constant along their respective extension.

In some embodiments such as that shown in FIG. 6, the central portion L1 may have a fourth circumferential groove 19 located so as to define a third circumferential rib 20 between the first circumferential rib 9 and the outer shoulder region L2.

Still in order to keep a proper amount of rubber on the ground, also the third circumferential rib 20 is characterized by a low void-to-rubber ratio.

Preferably, the third circumferential rib 20 has a void-to-rubber ratio smaller than, or equal to, about 0.09.

To this end, the third circumferential rib 20 comprises a plurality of seventh transverse grooves 14 having a limited extension and/or width.

Preferably, the seventh transverse grooves 14 extend over at least 70%, more preferably over at least 90%, of the width of the third circumferential rib 20.

In the embodiment shown in FIG. 6, the seventh grooves 14 extend from the first circumferential groove 2 to the fourth circumferential groove 19, i.e., they extend over the full width of the third circumferential rib 20.

In order to reduce excessive stiffness variations in the tread band in axial direction, the seventh grooves 14 extend, preferably from the first circumferential groove 2, so as to be located substantially along the extension direction of the second transverse grooves 7.

Preferably, the course of the seventh grooves 14 forms an angle α' with the equatorial plane X-X of between 750 and 90°.

Preferably, the seventh grooves 14 have a width equal to, or greater than, about 1 mm.

Preferably, the seventh grooves 14 have a width equal to, or smaller than, about 6 mm.

The seventh transverse grooves 14 may have a depth greater than, or equal to, about 2 mm. For example, they may have a depth of between about 2.5 and about 5 mm. The seventh grooves 14 may have a depth that is not constant along their respective extension.

Preferably, the seventh grooves 14 have a first portion 14A and a second portion 14B having different widths, arranged consecutively to each other.

Various modifications may be made to the embodiments described herein in detail, while still remaining within the scope of protection of the invention, as defined by the following claims.

The invention claimed is:

1. A car tyre having a tread band comprising a central region, extending across an equatorial plane (X-X) of the tyre, an outer shoulder region located towards an outer side of the tyre and an inner shoulder region located towards an inner side of the tyre; the tread band further comprising:

a first circumferential groove axially delimiting the outer shoulder region relative to the central region and a second circumferential groove axially delimiting the inner shoulder region relative to the central region;

the outer shoulder region having a width greater than a width of the inner shoulder region; and the outer shoulder region and the inner shoulder region comprise a plurality of first transverse grooves having a first end located substantially at the respective edge of the tread band, having a maximum width greater than, or equal to, 3 mm and an extension equal to at least 50% of the width of the shoulder region where the plurality of first transverse grooves are located; wherein the outer shoulder region comprises a plurality of second transverse grooves extending from the first circumferential groove;

the second transverse grooves have a width smaller than the first transverse grooves and a counter-inclined course relative to the first transverse grooves;

the central region comprising a first and a second circumferential rib separated by a third circumferential groove, and the first and second circumferential ribs having a void-to-rubber ratio equal to, or smaller than, 0.09.

2. The tyre according to claim 1, wherein the second transverse grooves are inclined relative to a direction parallel to the equatorial plane (X-X) to form an angle ($\alpha'$) greater than 75°.

3. The tyre according to claim 1, wherein the second transverse grooves have an extension equal to, or smaller than, 90% of the width of the outer shoulder region.

4. The tyre according to claim 1, wherein the second transverse grooves do not have intersection points with the first transverse grooves.

5. The tyre according to claim 1, wherein in the outer shoulder region, the second transverse grooves and the first transverse grooves have a segment of their extension in a common circumferential annular portion having a width equal to at least ⅓ of the width of the outer shoulder region.

6. The tyre according to claim 1, wherein in the outer shoulder region, the second transverse grooves and the first transverse grooves have a segment of their extension in a common circumferential annular portion having a width equal to at most ⅔ of the width of the outer shoulder region.

7. The tyre according to claim 1, wherein the first transverse grooves have substantially straight course.

8. The tyre according to claim 1, wherein the second transverse grooves have a substantially straight course.

9. The tyre according to claim 1, wherein the void-to-rubber ratio of the inner shoulder region results only from the first transverse grooves.

10. The tyre according to claim 1, wherein in the inner shoulder region, the first transverse grooves have an extension equal to, or smaller than, 90% of the width of the inner shoulder region.

11. The tyre according to claim 1, wherein the number of the first transverse grooves of the outer shoulder region is lower than the number of the first transverse grooves of the inner shoulder region.

12. The tyre according to claim 11, wherein the number of first transverse grooves of the inner shoulder region is about twice the number of first transverse grooves of the outer shoulder region.

13. The tyre according to claim 1, wherein the outer shoulder region comprises a plurality of longitudinal grooves, having a substantially circumferential course.

14. The tyre according to claim 13, wherein the longitudinal grooves intersect at least some of the first transverse grooves.

15. The tyre according to claim 1, wherein the central region comprises a third circumferential rib separated from the first circumferential rib by a fourth circumferential groove.

16. The tyre according to claim 15, wherein the third circumferential rib has a void-to-rubber ratio equal to, or smaller than, 0.09.

17. The tyre according to claim 15, wherein the third circumferential rib comprises a plurality of seventh transverse grooves.

18. The tyre according to claim 17, wherein the seventh transverse grooves have an extension equal to, or greater than, 60% of a width of the third circumferential rib.

19. The tyre according to claim 17, wherein the seventh transverse grooves extend from the first circumferential groove to be located along the extension direction of the second transverse grooves.

20. The tyre according to claim 1, wherein the first circumferential rib comprises a plurality of third transverse grooves extending from the first circumferential groove to be located along the extension direction of the second transverse grooves.

21. The tyre according to claim 20, wherein the void-to-rubber ratio of the first circumferential rib results only from the third transverse grooves.

22. The tyre according to claim 20, wherein the third transverse grooves have an extension equal to, or smaller than, 80% of a width of the first circumferential rib.

23. The tyre according to claim 22, wherein the third transverse grooves have an extension equal to, or smaller than, 50% of a width of the first circumferential rib.

24. The tyre according to claim 20, wherein the first circumferential rib comprises a plurality of fifth transverse grooves.

25. The tyre according to claim 24, wherein the fifth transverse grooves have an extension equal to, or smaller than, 50% of a width of the first circumferential rib.

26. The tyre according to claim 24, wherein the fifth transverse grooves have a width greater than the third transverse grooves.

27. The tyre according to claim 1, wherein the second circumferential rib comprises a plurality of fourth transverse grooves.

28. The tyre according to claim 27, wherein the fourth transverse grooves have an extension equal to, or greater than, 50% of a width of the second circumferential rib.

29. The tyre according to claim 27, wherein the fourth transverse grooves have at least one first segment and at least one second segment consecutively located relative to the first segment, and the second segment counter-inclined relative to the first segment.

30. The tyre according to claim 29, wherein the first segment extends from the third circumferential groove.

31. The tyre according to claim 29, wherein the first segment extends to be located along an extension direction of the second transverse grooves.

32. The tyre according to claim 29, wherein the second segment extends over at least 50% of the total extension of the fourth transverse grooves.

33. The tyre according to claim 29, wherein the first segment extends over at most 20% of the total extension of the fourth transverse grooves.

34. The tyre according to claim 29, wherein the second segment has a first portion having a width equal to, or greater than, 3 mm.

35. The tyre according to claim 34, wherein the second segment has a second portion having a width smaller than the width of the first portion.

\* \* \* \* \*